US012720460B2

(12) United States Patent
Zhang et al.

(10) Patent No.: US 12,720,460 B2
(45) Date of Patent: Aug. 25, 2026

(54) NETWORK ACCESS METHOD, NETWORK-SIDE DEVICE, AND TERMINAL IN DISASTER CONDITION

(71) Applicant: VIVO MOBILE COMMUNICATION CO., LTD., Dongguan (CN)

(72) Inventors: Pengfei Zhang, Dongguan (CN); Lufeng Han, Dongguan (CN); Wen Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 213 days.

(21) Appl. No.: 18/377,870

(22) Filed: Oct. 9, 2023

(65) Prior Publication Data

US 2024/0040532 A1 Feb. 1, 2024

Related U.S. Application Data

(63) Continuation of application No. PCT/CN2022/085749, filed on Apr. 8, 2022.

(30) Foreign Application Priority Data

Apr. 9, 2021 (CN) ......................... 202110384108.5

(51) Int. Cl.

*H04W 60/04* (2009.01)
*H04W 12/06* (2021.01)
*H04W 48/02* (2009.01)

(52) U.S. Cl.

CPC ........... *H04W 60/04* (2013.01); *H04W 12/06* (2013.01); *H04W 48/02* (2013.01)

(58) Field of Classification Search

CPC ..... H04W 60/04; H04W 12/06; H04W 48/02; H04W 12/71; H04W 24/04; H04W 60/00
See application file for complete search history.

(56) References Cited

U.S. PATENT DOCUMENTS 10,034,214 B2 7/2018 Jung et al.
10,165,319 B2 12/2018 Chen et al.
(Continued)

FOREIGN PATENT DOCUMENTS

CN 101873561 A 10/2010
CN 104052744 A 9/2014
(Continued)

OTHER PUBLICATIONS

3GPP TSG-CT WG1 Meeting #128-e, InterDigital Disaster Inbound roamer Registration using a Disaster Response Function, Feb. 25-Mar. 5, 2021, 3GPP TR 24.811, pp. 1-5 (Year: 2021).*
(Continued)

*Primary Examiner* — Brandon J Miller
(74) *Attorney, Agent, or Firm* — The Webb Law Firm

(57) ABSTRACT

A network access method includes receiving a registration request transmitted by a terminal; and transmitting a registration accept message to the terminal for indicating that the first network is allowed to be accessed when a first condition is met, the first condition including the following that: the terminal accesses the first network in a first access mode, a second network is in a DC or the first network is notified that the second network is in a DC, and an authentication result of the terminal is that the terminal is capable of obtaining a DC service; or that: the terminal accesses the first network in a DC dedicated registration mode, a second network is in a DC or the first network is notified that the second network is in a DC, and an authentication result of the terminal is that the terminal is capable of obtaining a DC service.

15 Claims, 4 Drawing Sheets

(56) References Cited

U.S. PATENT DOCUMENTS

| | | | |
|---|---|---|---|
| 11,665,025 | B2 | 5/2023 | Cao et al. |
| 2019/0261233 | A1 | 8/2019 | Duan et al. |

FOREIGN PATENT DOCUMENTS

| | | | | | |
|---|---|---|---|---|---|
| CN | 107666723 | A | | 2/2018 | |
| CN | 106416378 | B | | 4/2020 | |
| CN | 109804671 | B | | 5/2020 | |
| WO | 2010124586 | A1 | | 11/2010 | |
| WO | 2015072752 | A1 | | 5/2015 | |
| WO | WO-2021007447 | A1 | * | 1/2021 | .......... H04W 36/385 |
| WO | WO-2021015597 | A1 | * | 1/2021 | ............ H04W 48/10 |

OTHER PUBLICATIONS

3rd Generation Partnership Project, "Technical Specification Group Core Network and Terminals; Study on the support for minimization of service interruption; (Release 17)", 3GPP TR 24.811, Mar. 2021, v.1.0.0.

3rd Generation Partnership Project, "Technical Specification Group Core Network and Terminals; Non-Access-Stratum (NAS) protocol for 5G System (5GS); Stage 3; (Release 17)", 3GPP TS 24.501, Apr. 2021, v17.2.1.

Interdigital, "KI#4: Disaster inbound roamer Registration using a Disaster Response Function (DRF)", 3GPP TSG-CT WG1 Meeting #128-e, Electronic meeting, Feb. 25-Mar. 5, 2021, C1-211370.

* cited by examiner

NETWORK ACCESS METHOD, NETWORK-SIDE DEVICE, AND TERMINAL IN DISASTER CONDITION

CROSS-REFERENCE TO RELATED APPLICATIONS

This application is a Bypass Continuation application of International Patent Application No. PCT/CN2022/085749, filed Apr. 8, 2022, and claims priority to Chinese Patent Application No. 202110384108.5, filed Apr. 9, 2021, the disclosures of which are hereby incorporated by reference in their entireties.

BACKGROUND OF THE INVENTION

Field of the Invention

This application belongs to the technical field of communications, and to a network access method, a network-side device, and a terminal.

Description of Related Art

For terminals with emergency services to be forwarded, in order to avoid the terminals being incapable of obtaining services or causing long-term service interruption in a disaster condition (DC), and to improve the service experiences of users, it is necessary to provide a way to access a terminal forbidden public land mobile network (PLMN) to minimize the impact of the service interruption of the terminals.

SUMMARY OF THE INVENTION

Embodiments of this application provide a network access method, a network-side device, and a terminal.

According to a first aspect, a network access method is provided. The method includes:

receiving, by a first network, a registration request transmitted by a terminal; and transmitting, by the first network, a registration accept message to the terminal for indicating that the first network is allowed to be accessed in a case that a first condition is met.

The first condition includes any one of the following that:

the terminal accesses the first network in a first access mode, a second network is in a disaster condition DC or the first network is notified that the second network is in a DC, and an authentication result of the terminal is that the terminal is capable of obtaining a DC service, the first access mode including initial registration, or mobile and periodic update registration; or the terminal accesses the first network in a DC dedicated registration mode, a second network is in a DC or the first network is notified that the second network is in a DC, and an authentication result of the terminal is that the terminal is capable of obtaining a DC service.

The first network is a network capable of providing a first service, and the first service includes a DC roaming service.

The second network includes at least one of the following:

a network accessed by the terminal currently;

a home network of the terminal; and a network in a DC.

According to a second aspect, a network access method is provided. The method includes:

transmitting, by a terminal, a registration request to a first network; and receiving, by the terminal, a registration accept message transmitted by the first network for indicating that the first network is allowed to be accessed in a case that a first condition is met.

The first condition includes any one of the following that:

the terminal accesses the first network in a first access mode, a second network is in a disaster condition DC or the first network is notified that the second network is in a DC, and an authentication result of the terminal is that the terminal is capable of obtaining a DC service, the first access mode including initial registration, or mobile and periodic update registration; or the terminal accesses the first network in a DC dedicated registration mode, a second network is in a DC or the first network is notified that the second network is in a DC, and an authentication result of the terminal is that the terminal is capable of obtaining a DC service.

The first network is a network capable of providing a first service, and the first service includes a DC roaming service.

The second network includes at least one of the following:

a network accessed by the terminal currently;

a home network of the terminal; and a network in a DC.

According to a third aspect, a network access apparatus is provided. The apparatus is applied to a network-side device, and includes:

a receiving module, configured to receive a registration request transmitted by a terminal; and a transmitting module, configured to transmit a registration accept message to the terminal for indicating that a first network is allowed to be accessed in a case that a first condition is met.

The first condition includes any one of the following that:

the terminal accesses the first network in a first access mode, a second network is in a disaster condition DC or the first network is notified that the second network is in a DC, and an authentication result of the terminal is that the terminal is capable of obtaining a DC service, the first access mode including initial registration, or mobile and periodic update registration; or the terminal accesses the first network in a DC dedicated registration mode, a second network is in a DC or the first network is notified that the second network is in a DC, and an authentication result of the terminal is that the terminal is capable of obtaining a DC service.

The first network is a network capable of providing a first service, and the first service includes a DC roaming service.

The second network includes at least one of the following:

a network accessed by the terminal currently;

a home network of the terminal; and a network in a DC.

According to a fourth aspect, a network access apparatus is provided. The apparatus is applied to a terminal, and includes:

a transmitting module, configured to transmit a registration request to a first network; and a receiving module, configured to receive a registration accept message transmitted by the first network for indicating that the first network is allowed to be accessed in a case that a first condition is met.

The first condition includes any one of the following that:

the terminal accesses the first network in a first access mode, a second network is in a disaster condition DC or the first network is notified that the second network is in a DC, and an authentication result of the terminal is that the terminal is capable of obtaining a DC service, the first access mode including initial registration, or mobile and periodic update registration; or the terminal accesses the first network in a DC dedicated registration mode, a second network is in a DC or the first network is notified that the second network is in a DC, and an authentication result of the terminal is that the terminal is capable of obtaining a DC service.

The first network is a network capable of providing a first service, and the first service includes a DC roaming service.

The second network includes at least one of the following:

a network accessed by the terminal currently;

a home network of the terminal; and a network in a DC.

According to a fifth aspect, a network-side device is provided. The network-side device includes a processor, a memory, and programs or instructions stored in the memory and executable on the processor. The programs or instructions, when executed by the processor, implement steps of the method as described in the first aspect.

According to a sixth aspect, a network-side device is provided, including a processor and a communication interface. The communication interface is configured to: receive a registration request transmitted by a terminal; and transmit a registration accept message to the terminal for indicating that a first network is allowed to be accessed in a case that a first condition is met.

The first condition includes any one of the following that:

the terminal accesses the first network in a first access mode, a second network is in a disaster condition DC or the first network is notified that the second network is in a DC, and an authentication result of the terminal is that the terminal is capable of obtaining a DC service, the first access mode including initial registration, or mobile and periodic update registration; or the terminal accesses the first network in a DC dedicated registration mode, a second network is in a DC or the first network is notified that the second network is in a DC, and an authentication result of the terminal is that the terminal is capable of obtaining a DC service.

The first network is a network capable of providing a first service, and the first service includes a DC roaming service.

The second network includes at least one of the following:

a network accessed by the terminal currently;

a home network of the terminal; and a network in a DC.

According to a seventh aspect, a terminal is provided. The terminal includes a processor, a memory, and programs or instructions stored in the memory and executable on the processor. The programs or instructions, when executed by the processor, implement steps of the method as described in the second aspect.

According to an eighth aspect, a terminal is provided, including a processor and a communication interface. The communication interface is configured to: transmit a registration request to a first network; and receive a registration accept message transmitted by the first network for indicating that the first network is allowed to be accessed in a case that a first condition is met.

The first condition includes any one of the following that:

the terminal accesses the first network in a first access mode, a second network is in a disaster condition DC or the first network is notified that the second network is in a DC, and an authentication result of the terminal is that the terminal is capable of obtaining a DC service, the first access mode including initial registration, or mobile and periodic update registration; or the terminal accesses the first network in a DC dedicated registration mode, a second network is in a DC or the first network is notified that the second network is in a DC, and an authentication result of the terminal is that the terminal is capable of obtaining a DC service.

The first network is a network capable of providing a first service, and the first service includes a DC roaming service.

The second network includes at least one of the following:

a network accessed by the terminal currently;

a home network of the terminal; and a network in a DC.

According to a ninth aspect, a non-transitory readable storage medium is provided. The non-transitory readable storage medium stores programs or instructions. The programs or instructions, when executed by a processor, implement steps of the method as described in the first aspect or implement steps of the method as described in the second aspect.

According to a tenth aspect, a chip is provided. The chip includes a processor and a communication interface. The communication interface is coupled to the processor. The processor is configured to execute programs or instructions to implement steps of the method as described in the first aspect or implement steps of the method as described in the second aspect.

According to an eleventh aspect, a computer program/program product is provided. The computer program/program product is stored in a non-transient storage medium. The program/program product is executed by at least one processor to implement steps of the method as described in the first aspect or implement steps of the method as described in the second aspect.

BRIEF DESCRIPTION OF THE DRAWINGS

FIG. 6 is a schematic structural diagram of a communication device according to an embodiment of this application.

DESCRIPTION OF THE INVENTION

The technical solutions in embodiments of this application are clearly and completely described in the following with reference to the accompanying drawings in the embodiments of this application. Apparently, the described embodiments are merely some rather than all of the embodiments of this application. All other embodiments obtained by a person skilled in the art based on the embodiments of this application fall within the protection scope of this application.

The terms "first" and "second" in the specification and claims of this application are used to distinguish similar objects, but are unnecessarily used to describe a specific sequence or order. It is to be understood that the terms used in this way are exchangeable in a proper case, so that the embodiments of this application described herein can be implemented in an order different from the order shown or described herein. The objects distinguished by "first" and "second" are generally in one class, and the number of objects is not limited. For example, there may be one or more first objects. In addition, "and/or" in the specification and claims represents at least one of the connected objects, and the character "I" generally represents that the associated objects are in an "or" relation.

It is to be noted that the technologies described in the embodiments of this application are not limited to a long term evolution (LTE)/LTE-advanced (LTE-A) system, and may further be applied to other wireless communication systems such as code division multiple access (CDMA), time division multiple access (TDMA), frequency division multiple access (FDMA), orthogonal frequency division multiple access (OFDMA), single-carrier frequency division multiple access (SC-FDMA), and other systems. The terms "system" and "network" in the embodiments of this application are often used interchangeably. The technology described may be applied to the systems and radio technologies mentioned above, and may also be applied to other systems and radio technologies. The following description describes a new radio (NR) system for example purposes and uses the NR term in most of the following descriptions, but these technologies may also be applied to applications other than NR system applications, such as 6th generation (6G) communication systems.

Figures 1, 2:
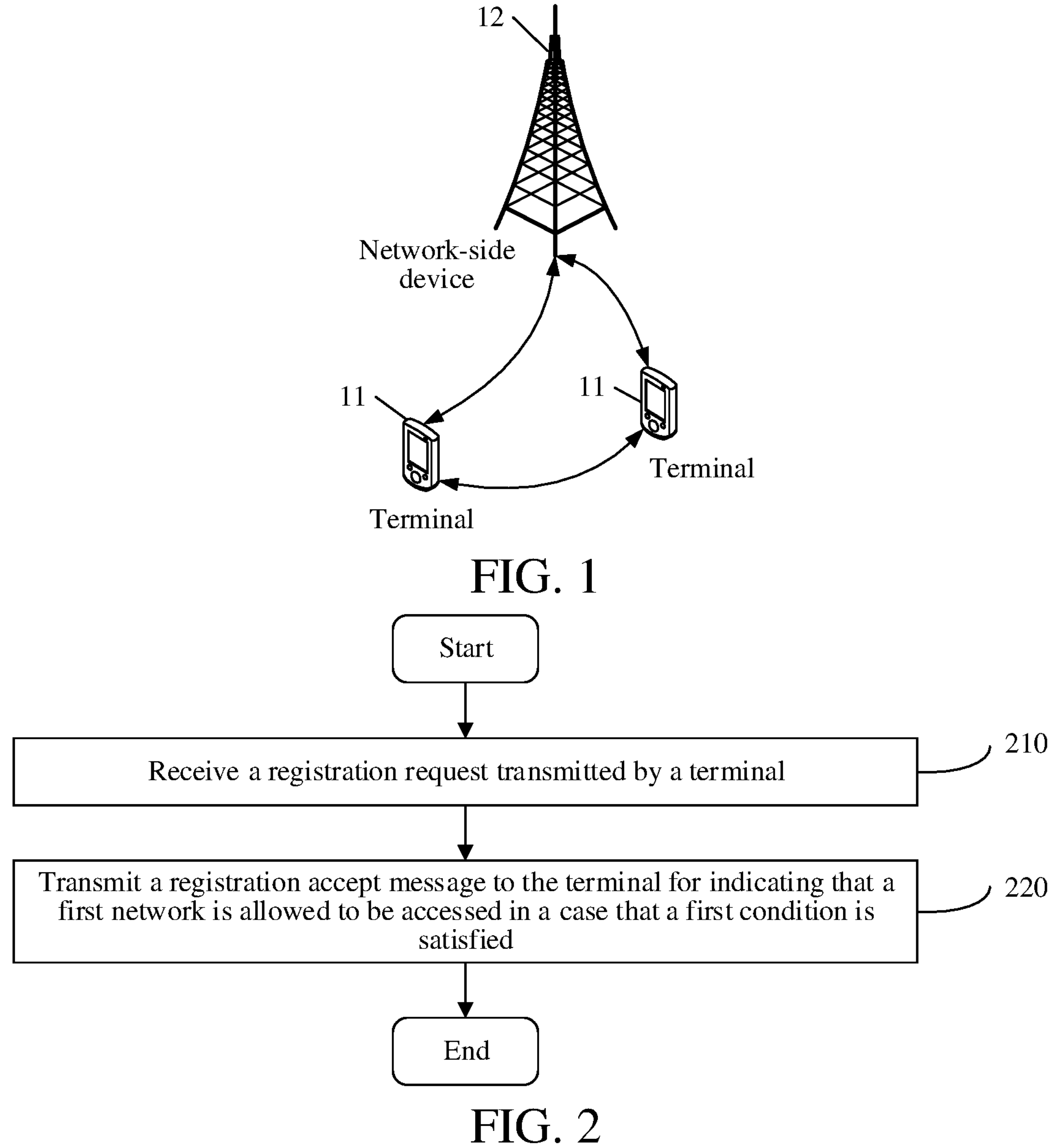
FIG. 1 is a block diagram of a wireless communication system to which embodiments of this application may be applied.
FIG. 2 is a schematic flowchart 1 of a network access method according to an embodiment of this application.

FIG. 1 shows a block diagram of a wireless communication system to which embodiments of this application may be applied. The wireless communication system includes a terminal 11 and a network-side device 12. The terminal 11 may also be referred to as a terminal device or user equipment (UE). The terminal 11 may be a terminal-side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device, or vehicle user equipment (VUE), and pedestrian user equipment (PUE). The wearable device includes: smart watches, bracelets, headphones, glasses, and the like. It is to be noted that the specific type of the terminal 11 is not limited in the embodiments of this application. The network-side device 12 may be a base station or a core network. The base station may be referred to as a node B, an evolved node B, an access point, a base transceiver station (BTS), a radio base station, a radio transceiver, a basic service set (BSS), an extended service set (ESS), a node B, an evolved node B (eNB), a home node B, a home evolved node B, a WLAN access point, a WiFi node, a transmitting receiving point (TRP), or some other suitable term in the art. The base station is not limited to a particular technical vocabulary as long as the same technical effect is achieved. It is to be noted that only a base station in an NR system is used as an example in the embodiments of this application, but a specific type of the base station is not limited.

In order to more fully understand the technical solution provided by the embodiments of this application, the following contents are introduced.

Minimization of service interruption (MINT) description: in the case of a disaster (such as a fire), a mobile network may not provide services. The requirements listed in this section make 5GS capable of reducing service interruptions. If there is a PLMN operator ready to provide a service, a terminal may obtain the service in the case of a disaster. The minimization of service interruption is only limited to a specific time and place. In order to reduce the impact on 5G systems supporting disaster roaming, a potential congestion caused by the rush-in or rush-out of a disaster inbound roamer is considered.

Requirements in MINT scenario:

subject to regulatory requirements or operator policies, a 3GPP system shall enable a terminal of a given PLMN to obtain a connection service (for example, a voice call or a mobile data service) from another PLMN suitable for an area in a disaster condition.

Terminal access principle in MINT scenario (terminal access criterion in disaster scenario):

the 3GPP system shall provide a method by which a terminal can access a PLMN in a forbidden PLMN list in a disaster condition and in a case that no PLMN other than the PLMN in the forbidden PLMN list is available.

Terminal access criterion in non-disaster scenario:

a terminal is not allowed to access a forbidden PLMN in a non-disaster scenario (that is, a service PLMN of the terminal is paralyzed not in a disaster and cannot serve terminal services).

The network access method, the network-side device, and the terminal provided by the embodiments of this application will be described with reference to the accompanying drawings through some embodiments and application scenarios thereof.

FIG. 2 is a schematic flowchart of a network access method according to an embodiment of this application. Referring to FIG. 2, the embodiments of this application provide a network access method, which may include the following steps:

Step 210: Receive a registration request transmitted by a terminal.

Step 220: Transmit a registration accept message to the terminal for indicating that a first network is allowed to be accessed in a case that a first condition is met.

The first condition includes any one of the following that:

the terminal accesses the first network in a first access mode, a second network is in a disaster condition DC or the first network is notified that the second network is in a DC, and an authentication result of the terminal is that the terminal is capable of obtaining a DC service, the first access mode including initial registration, or mobile and periodic update registration; or the terminal accesses the first network in a DC dedicated registration mode, a second network is in a DC or the first network is notified that the second network is in a DC, and an authentication result of the terminal is that the terminal is capable of obtaining a DC service.

The first network is a network capable of providing a first service, and the first service includes a DC roaming service.

The second network includes at least one of the following:

a network accessed by the terminal currently;

a home network of the terminal; and a network in a DC.

It is to be noted that the executive entity of the network access method provided by the embodiments of this application may be a first network, such as a PLMN.

The technical solution of this application is described based on an example where the network access method provided by the embodiments of this application is performed by the first network.

In step 210, the terminal may transmit a registration request to the first network to access the first network, so as to obtain a first service from the first network. After the terminal transmits the registration request, the first network may receive the registration request transmitted by the terminal.

In step 220, the first network may determine whether a first condition is met. If yes, the first network may transmit a registration accept message to the terminal, so as to indicate that the first network is allowed to be accessed by the terminal.

For example, the first network may transmit the registration accept message to the terminal when the following condition is met, namely when the terminal accesses the first network in a first access mode, the second network is in a disaster condition DC or the first network is notified that the second network is in a DC, and the authentication result of the terminal is that the terminal is capable of obtaining a DC service.

Alternatively, the first network may transmit the registration accept message to the terminal when the following condition is met, namely when the terminal accesses the first network in a DC dedicated registration mode (scheme of HW), the second network is in a DC or the first network is notified that the second network is in a DC, and the authentication result of the terminal is that the terminal is capable of obtaining a DC service.

It is to be noted that in the embodiments of this application, the first network may be a network capable of providing the first service, such as a PLMN capable of providing the first service.

The first service may include a DC roaming service. Correspondingly, when the first network transmits the registration accept message to the terminal, the terminal may obtain the DC service from the first network so as to obtain the DC service in a DC scenario.

The second network may include at least one of the following:

- a network accessed by the terminal currently, where the second network may be, for example, a PLMN accessed by the terminal currently;
- a home network of the terminal; where the second network may be, for example, a home PLMN of the terminal; and
- a network in a DC, where the second network may be, for example, a PLMN in a DC.

It is to be understood that the second network may include only one or more of the foregoing three networks. For example, in some cases, the second network may be a PLMN that is in a DC and is accessed by the terminal currently. While in other cases, the second network may be a PLMN that is in a DC and is accessed by the terminal currently and a home PLMN of the terminal, which will not be exemplified in the embodiments of this application one by one.

According to the network access method provided by the embodiments of this application, a terminal is provided with a DC service by accepting a registration request of the terminal in a case that a first condition is met. It may be ensured that the terminal can quickly obtain the DC service in a DC scenario, thus ensuring the normal operation of the service and effectively reducing the interruption time of the service.

In one embodiment, the network access method provided by the embodiments of this application may further include the following steps.

The first network transmits a registration reject message to the terminal in a case that a second condition is met.

The second condition includes any one of the following:

Condition 1: The terminal accesses the first network in the first access mode, and the second network is not in a DC or the first network is not notified that the second network is in a DC.

For example, the terminal accesses the first network by mobile and periodic update registration (for example, the terminal manually selects the first network to be accessed). However, at this moment, the second network is not in a DC or the second network does not notify the first network that the second network is in a DC. Then, the first network may transmit a registration reject message to the terminal.

Condition 2: The terminal accesses the first network in the first access mode, the second network is in a DC or the first network is notified that the second network is in a DC, and the authentication result of the terminal is that the terminal is incapable of obtaining a DC service.

For example, the terminal accesses the first network by initial registration, and the second network is in a DC or the second network notifies the first network that the second network is in a DC, but the authentication result of the terminal is that the terminal is incapable of obtaining a DC service. Then, the first network may transmit a registration reject message to the terminal.

Condition 3: The terminal accesses the first network in the DC dedicated registration mode, and the second network is not in a DC or the first network is not notified that the second network is in a DC.

For example, the terminal accesses the first network in the DC dedicated registration mode. However, at this moment, the second network is not in a DC or the second network does not notify the first network that the second network is in a DC. Then, the first network may transmit a registration reject message to the terminal.

Condition 4: The terminal accesses the first network in the DC dedicated registration mode, the second network is in a DC or the first network is notified that the second network is in a DC, and the authentication result of the terminal is that the terminal is incapable of obtaining a DC service.

For example, the terminal accesses the first network in the DC dedicated registration mode, and the second network is in a DC or the second network notifies the first network that the second network is in a DC, but the authentication result of the terminal is that the terminal is incapable of obtaining a DC service. Then, the first network may transmit a registration reject message to the terminal.

In one embodiment, the authentication result of the terminal may be determined in any one of the following modes.

Mode 1: The first network transmits the registration request and/or an authentication request to the second network, and receives an authentication result transmitted by the second network after authenticating the terminal.

After receiving the registration request transmitted by the terminal, the first network may forward the registration request to the second network or transmit an authentication request to the second network. The authentication request includes information of the terminal, such as a terminal ID or a terminal IP address. The first network may also transmit the registration request and the authentication request to the second network at the same time.

After receiving the registration request and/or the authentication request transmitted by the first network, the second network may authenticate the terminal according to the registration request and/or the authentication request (the authentication process of the second network may be based on the conclusion of SA3), so as to determine whether the terminal is capable of obtaining a DC service, and to transmit the authentication result to the first network.

Mode 2: The first network requests for contract information between the terminal and the second network from the second network, and authenticates the terminal according to the contract information to determine the authentication result.

After receiving the registration request transmitted by the terminal, the first network may request for the contract information between the terminal and the second network from the second network. The first network may also request for the contract information between the terminal and the second network in advance before receiving the registration request transmitted by the terminal.

After the second network transmits the contract information between the terminal and the second network to the first network, the first network may authenticate the terminal according to the contract information (the authentication process of the first network may be based on the conclusion of SA3), so as to determine whether the terminal is capable of obtaining a DC service.

According to the network access network provided by the embodiments of this application, a terminal may be authenticated by directly authenticating the terminal through a first network or by authenticating the terminal through a second network and then transmitting an authentication result. The application requirements in various scenarios can be met, thus effectively ensuring that the terminal is capable of quickly obtaining a DC service in a DC scenario.

In one embodiment, the registration reject message may include a first cause value in a case that the terminal accesses the first network in the first access mode and the second network is not in a DC or the first network is not notified that the second network is in a DC. The first cause value indicates that the first network cannot be accessed.

It is to be noted that in a case that the terminal accesses the first network in the first access mode and the second network is not in a DC or the first network is not notified that the second network is in a DC, the first network may reject the registration request of the terminal and transmit a registration reject message. The registration reject message may include a first cause value, such as #11 "PLMN not allowed (PLMN not allowed)".

In one embodiment, in a case that the terminal accesses the first network in the first access mode, the second network is in a DC or the first network is notified that the second network is in a DC, and the authentication result of the terminal is that the terminal is incapable of obtaining the DC service, the registration reject message includes at least one of the following:

a second cause value, indicating an illegal mobile device, no access to the first network or no roaming allowed in a tracking area; and first information, including first indication information for indicating that the terminal is incapable of obtaining the DC service; or including second indication information for indicating a list of networks incapable of providing the terminal with the DC service. The list of networks includes information of the first network.

It is to be noted that in a case that the terminal accesses the first network in the first access mode, the second network is in a DC or the first network is notified that the second network is in a DC, and the authentication result of the terminal is that the terminal is incapable of obtaining the DC service, the first network may reject the registration request of the terminal and transmit a registration reject message. The registration reject message may include a second cause value, such as #6 "illegal ME", #11 "PLMN not allowed", or #13 "roaming not allowed in the tracking area".

In addition, the registration reject message may further include first information for indicating that the terminal is incapable of obtaining the DC service, or indicating a list of networks incapable of providing the terminal with the DC service. The list of networks includes information of the first network.

After the terminal receives the first information, if the terminal does not obtain the first information in advance, the first information will be stored. If the terminal has obtained the first information in advance, the existing first information will be updated.

In one embodiment, the registration reject message includes a third cause value in a case that the terminal accesses the first network in the DC dedicated registration mode and the second network is not in a DC or the first network is not notified that the second network is in a DC. The third cause value indicates that service options cannot be supported or that requested service options are not subscribed.

It is to be noted that in a case that the terminal accesses the first network in the DC dedicated registration mode and the second network is not in a DC or the first network is not notified that the second network is in a DC, the first network may reject the registration request of the terminal and transmit a registration reject message. The registration reject message may include a third cause value, such as #32 "service option not supported" or #33 "requested service option not subscribed".

In one embodiment, in a case that the terminal accesses the first network in the DC dedicated registration mode, the second network is in a DC or the first network is notified that the second network is in a DC, and the authentication result of the terminal is that the terminal is incapable of obtaining the DC service, the registration reject message includes at least one of the following:

a fourth cause value, indicating an illegal mobile device, no access to the first network or no roaming allowed in a tracking area; and first information, including first indication information for indicating that the terminal is incapable of obtaining the DC service; or including second indication information for indicating a list of networks incapable of providing the terminal with the DC service. The list of networks includes information of the first network.

It is to be noted that in a case that the terminal accesses the first network in the DC dedicated registration mode, the second network is in a DC or the first network is notified that the second network is in a DC, and the authentication result of the terminal is that the terminal is incapable of obtaining the DC service, the first network may reject the registration request of the terminal and transmit a registration reject message. The registration reject message may include a fourth cause value, such as #6 "illegal ME", #11 "PLMN not allowed", or #13 "roaming not allowed in the tracking area".

In addition, the registration reject message may further include first information for indicating that the terminal is incapable of obtaining the DC service, or indicating a list of networks incapable of providing the terminal with the DC service. The list of networks includes information of the first network.

After the terminal receives the first information, if the terminal does not obtain the first information in advance, the first information will be stored. If the terminal has obtained the first information in advance, the existing first information will be updated.

In one embodiment, the registration accept message may include first information.

The first information includes third indication information for indicating that the terminal is capable of obtaining the DC service. Alternatively, the first information includes fourth indication information for indicating a list of networks capable of providing the terminal with the DC service. The list of networks includes information of the first network.

It is to be understood that the first network receives the registration request from the terminal and transmits a registration accept message to the terminal in a case that the first condition is met.

The registration accept message may include first information for indicating that the terminal is capable of obtaining the DC service, or indicating a list of networks capable of providing the terminal with the DC service. The list of networks includes information of the first network.

After the terminal receives the first information, if the terminal does not obtain the first information in advance, the first information will be stored. If the terminal has obtained the first information in advance, the existing first information will be updated.

Figures 3, 4, 5:
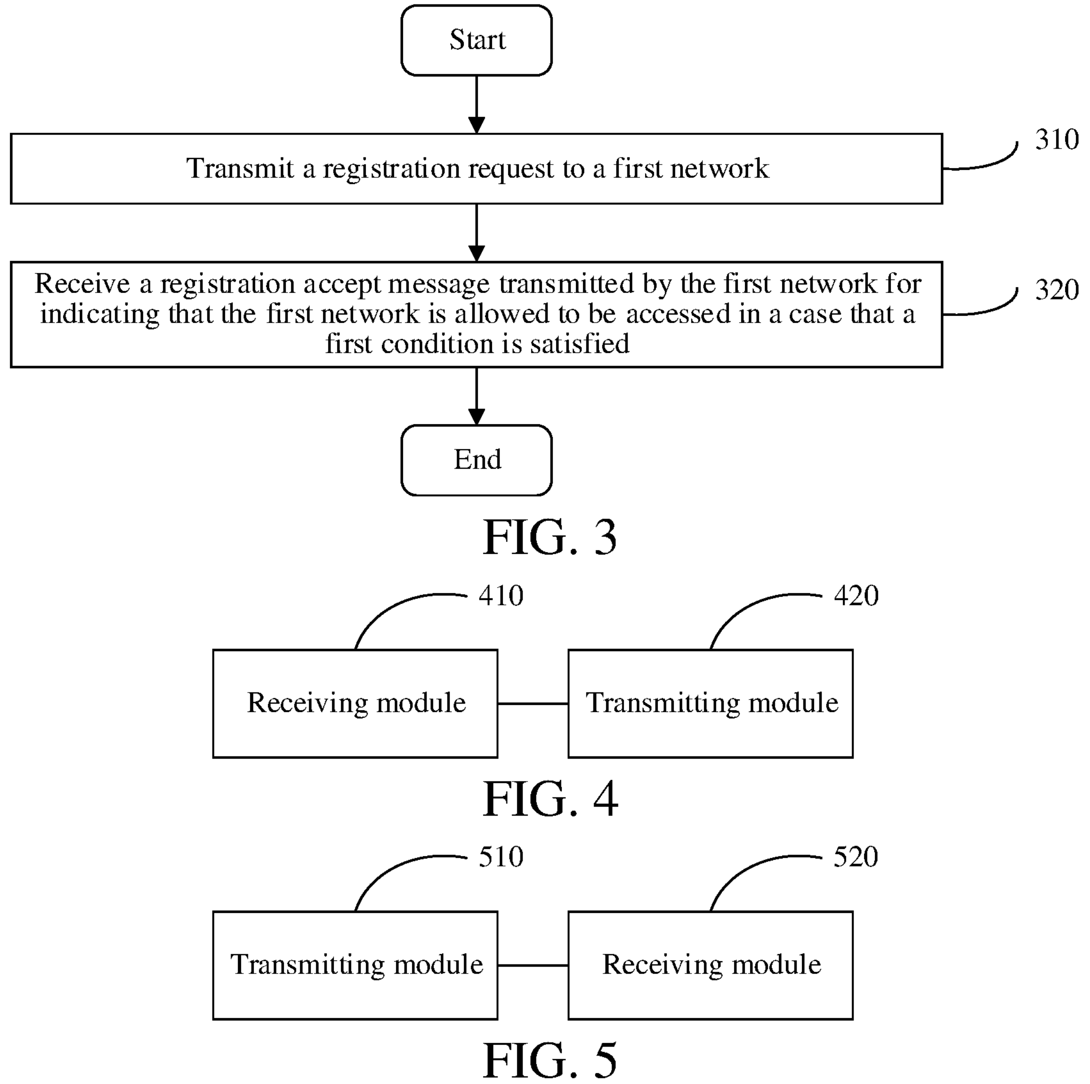
FIG. 3 is a schematic flowchart 2 of a network access method according to an embodiment of this application.
FIG. 4 is a schematic structural diagram 1 of a network access apparatus according to an embodiment of this application.
FIG. 5 is a schematic structural diagram 2 of a network access apparatus according to an embodiment of this application.

FIG. 3 is a schematic flowchart of a network access method according to an embodiment of this application. Referring to FIG. 3, the embodiments of this application provide a network access method, which may include the following steps:

Step 310: Transmit a registration request to a first network.

Step 320: Receive a registration accept message transmitted by the first network for indicating that the first network is allowed to be accessed in a case that a first condition is met.

The first condition includes any one of the following that:

- the terminal accesses the first network in a first access mode, a second network is in a disaster condition DC or the first network is notified that the second network is in a DC, and an authentication result of the terminal is that the terminal is capable of obtaining a DC service, the first access mode including initial registration, or mobile and periodic update registration; or
- the terminal accesses the first network in a DC dedicated registration mode, a second network is in a DC or the first network is notified that the second network is in a DC, and an authentication result of the terminal is that the terminal is capable of obtaining a DC service.

The first network is a network capable of providing a first service, and the first service includes a DC roaming service.

The second network includes at least one of the following:

- a network accessed by the terminal currently;
- a home network of the terminal; and
- a network in a DC.

It is to be noted that the executive entity of the network access method provided by the embodiments of this application may be a terminal, such as a mobile phone or a computer.

The technical solution of this application is described based on an example where the network access method provided by the embodiments of this application is performed by the terminal.

In step 310, the terminal may transmit a registration request to the first network to access the first network, so as to obtain a first service from the first network. After the terminal transmits the registration request, the first network may receive the registration request transmitted by the terminal.

In step 320, the first network may determine whether a first condition is met. If yes, the first network may transmit a registration accept message to the terminal, so as to indicate that the first network is allowed to be accessed by the terminal.

For example, the first network may transmit the registration accept message to the terminal when the following condition is met, namely when the terminal accesses the first network in a first access mode, the second network is in a disaster condition DC or the first network is notified that the second network is in a DC, and the authentication result of the terminal is that the terminal is capable of obtaining a DC service.

Alternatively, the first network may transmit the registration accept message to the terminal when the following condition is met, namely when the terminal accesses the first network in a DC dedicated registration mode (scheme of HW), the second network is in a DC or the first network is notified that the second network is in a DC, and the authentication result of the terminal is that the terminal is capable of obtaining a DC service.

It is to be noted that in the embodiments of this application, the first network may be a network capable of providing the first service, such as a PLMN capable of providing the first service.

The first service may include a DC roaming service. Correspondingly, when the first network transmits the registration accept message to the terminal, the terminal may obtain the DC service from the first network so as to obtain the DC service in a DC scenario.

The second network may include at least one of the following:

- a network accessed by the terminal currently, where the second network may be, for example, a PLMN accessed by the terminal currently;
- a home network of the terminal; where the second network may be, for example, a home PLMN of the terminal; and
- a network in a DC, where the second network may be, for example, a PLMN in a DC.

It is to be understood that the second network may include only one or more of the foregoing three networks. For example, in some cases, the second network may be a PLMN that is in a DC and is accessed by the terminal currently. While in other cases, the second network may be a PLMN that is in a DC and is accessed by the terminal currently and a home PLMN of the terminal, which will not be exemplified in the embodiments of this application one by one.

According to the network access method provided by the embodiments of this application, a terminal is provided with a DC service by accepting a registration request of the terminal in a case that a first condition is met. It may be ensured that the terminal can quickly obtain the DC service in a DC scenario, thus ensuring the normal operation of the service and effectively reducing the interruption time of the service.

In one embodiment, the network access method provided by the embodiments of this application may further include the following steps.

The terminal obtains first information, and transmits the registration request to the first network in a case that the first information meets a first predetermined condition.

The first predetermined condition includes any one of the following that:

the first information includes third indication information for indicating that the terminal is capable of obtaining the DC service; or the first information includes fourth indication information for indicating a list of networks capable of providing the terminal with the DC service. The list of networks includes information of the first network.

It is to be noted that the terminal may pre-configure the first information, or the network-side device may configure the first information for the terminal, and the terminal may obtain the first information from the registration accept message or the registration reject message returned by the first network during the last access to the first network.

The terminal may transmit the registration request to the first network in a case that the first information meets the first predetermined condition.

In one embodiment, the network access method provided by the embodiments of this application may further include the following steps.

The terminal obtains first information, and stops transmitting the registration request to the first network in a case that the first information meets a second predetermined condition.

The second predetermined condition includes any one of the following that:

the first information includes first indication information for indicating that the terminal is incapable of obtaining the DC service; or the first information includes second indication information for indicating a list of networks incapable of providing the terminal with the DC service. The list of networks includes information of the first network.

It is to be noted that the terminal may pre-configure the first information, or the network-side device may configure the first information for the terminal, and the terminal may obtain the first information from the registration accept message or the registration reject message returned by the first network during the last access to the first network.

The terminal may stop transmitting the registration request to the first network in a case that the first information meets the second predetermined condition.

According to the network access method provided by the embodiments of this application, a terminal is configured with first information in advance, and the terminal determines whether to transmit a registration request to a first network according to the content of the first information. Therefore, the waste of time resources and communication resources caused by the fact that the terminal cannot obtain a DC service but still transmits the registration request to the first network can be avoided, thus improving the efficiency of obtaining the DC service by the terminal.

In one embodiment, the network access method provided by the embodiments of this application may further include:

receiving a registration reject message transmitted by the first network in a case that a second condition is met.

The second condition includes any one of the following:

Condition 1: The terminal accesses the first network in the first access mode, and the second network is not in a DC or the first network is not notified that the second network is in a DC.

For example, the terminal accesses the first network by mobile and periodic update registration (for example, the terminal manually selects the first network to be accessed). However, at this moment, the second network is not in a DC or the second network does not notify the first network that the second network is in a DC. Then, the first network may transmit a registration reject message to the terminal.

Condition 2: The terminal accesses the first network in the first access mode, the second network is in a DC or the first network is notified that the second network is in a DC, and the authentication result of the terminal is that the terminal is incapable of obtaining a DC service.

For example, the terminal accesses the first network by initial registration, and the second network is in a DC or the second network notifies the first network that the second network is in a DC, but the authentication result of the terminal is that the terminal is incapable of obtaining a DC service. Then, the first network may transmit a registration reject message to the terminal.

Condition 3: The terminal accesses the first network in the DC dedicated registration mode, and the second network is not in a DC or the first network is not notified that the second network is in a DC.

For example, the terminal accesses the first network in the DC dedicated registration mode. However, at this moment, the second network is not in a DC or the second network does not notify the first network that the second network is in a DC. Then, the first network may transmit a registration reject message to the terminal.

Condition 4: The terminal accesses the first network in the DC dedicated registration mode, the second network is in a DC or the first network is notified that the second network is in a DC, and the authentication result of the terminal is that the terminal is incapable of obtaining a DC service.

For example, the terminal accesses the first network in the DC dedicated registration mode, and the second network is in a DC or the second network notifies the first network that the second network is in a DC, but the authentication result of the terminal is that the terminal is incapable of obtaining a DC service. Then, the first network may transmit a registration reject message to the terminal.

In one embodiment, the registration reject message may include a first cause value in a case that the terminal accesses the first network in the first access mode and the second network is not in a DC or the first network is not notified that the second network is in a DC. The first cause value indicates that the first network cannot be accessed.

It is to be noted that in a case that the terminal accesses the first network in the first access mode and the second network is not in a DC or the first network is not notified that the second network is in a DC, the first network may reject the registration request of the terminal and transmit a registration reject message. The registration reject message may include a first cause value, such as #11 "PLMN not allowed".

In one embodiment, in a case that the terminal accesses the first network in the first access mode, the second network is in a DC or the first network is notified that the second network is in a DC, and the authentication result of the terminal is that the terminal is incapable of obtaining the DC service, the registration reject message includes at least one of the following:

a second cause value, indicating an illegal mobile device, no access to the first network or no roaming allowed in a tracking area; and first information, including first indication information for indicating that the terminal is incapable of obtaining the DC service; or including second indication information for indicating a list of networks incapable of providing the terminal with the DC service. The list of networks includes information of the first network.

It is to be noted that in a case that the terminal accesses the first network in the first access mode, the second network is in a DC or the first network is notified that the second network is in a DC, and the authentication result of the terminal is that the terminal is incapable of obtaining the DC service, the first network may reject the registration request of the terminal and transmit a registration reject message. The registration reject message may include a second cause value, such as #6 “illegal ME”, #11 “PLMN not allowed”, or #13 “roaming not allowed in the tracking area”.

In addition, the registration reject message may further include first information for indicating that the terminal is incapable of obtaining the DC service, or indicating a list of networks incapable of providing the terminal with the DC service. The list of networks includes information of the first network.

After the terminal receives the first information, if the terminal does not obtain the first information in advance, the first information will be stored. If the terminal has obtained the first information in advance, the existing first information will be updated.

In one embodiment, the registration reject message includes a third cause value in a case that the terminal accesses the first network in the DC dedicated registration mode and the second network is not in a DC or the first network is not notified that the second network is in a DC. The third cause value indicates that service options cannot be supported or that requested service options are not subscribed.

It is to be noted that in a case that the terminal accesses the first network in the DC dedicated registration mode and the second network is not in a DC or the first network is not notified that the second network is in a DC, the first network may reject the registration request of the terminal and transmit a registration reject message. The registration reject message may include a third cause value, such as #32 “service option not supported” or #33 “requested service option not subscribed”.

In one embodiment, in a case that the terminal accesses the first network in the DC dedicated registration mode, the second network is in a DC or the first network is notified that the second network is in a DC, and the authentication result of the terminal is that the terminal is incapable of obtaining the DC service, the registration reject message includes at least one of the following:

- a fourth cause value, indicating an illegal mobile device, no access to the first network or no roaming allowed in a tracking area; and
- first information, including first indication information for indicating that the terminal is incapable of obtaining the DC service; or including second indication information for indicating a list of networks incapable of providing the terminal with the DC service. The list of networks includes information of the first network.

It is to be noted that in a case that the terminal accesses the first network in the DC dedicated registration mode, the second network is in a DC or the first network is notified that the second network is in a DC, and the authentication result of the terminal is that the terminal is incapable of obtaining the DC service, the first network may reject the registration request of the terminal and transmit a registration reject message. The registration reject message may include a fourth cause value, such as #6 “illegal ME”, #11 “PLMN not allowed”, or #13 “roaming not allowed in the tracking area”.

In addition, the registration reject message may further include first information for indicating that the terminal is incapable of obtaining the DC service, or indicating a list of networks incapable of providing the terminal with the DC service. The list of networks includes information of the first network.

After the terminal receives the first information, if the terminal does not obtain the first information in advance, the first information will be stored. If the terminal has obtained the first information in advance, the existing first information will be updated.

In one embodiment, the registration accept message may include first information.

The first information includes third indication information for indicating that the terminal is capable of obtaining the DC service. Alternatively, the first information includes fourth indication information for indicating a list of networks capable of providing the terminal with the DC service. The list of networks includes information of the first network.

It is to be understood that the first network receives the registration request from the terminal and transmits a registration accept message to the terminal in a case that the first condition is met.

The registration accept message may include first information for indicating that the terminal is capable of obtaining the DC service, or indicating a list of networks capable of providing the terminal with the DC service. The list of networks includes information of the first network.

After the terminal receives the first information, if the terminal does not obtain the first information in advance, the first information will be stored. If the terminal has obtained the first information in advance, the existing first information will be updated.

It is to be noted that the executive entity of the network access method provided by the embodiments of this application may be a network access apparatus or a control module in the network access apparatus for performing the network access method. In the embodiments of this application, the network access apparatus provided by the embodiments of this application is described by performing the network access method.

FIG. 4 is a schematic structural diagram 1 of a network access apparatus according to an embodiment of this application. Referring to FIG. 4, the embodiments of this application provide a network access apparatus, which may include:

- a receiving module 410, configured to receive a registration request transmitted by a terminal; and
- a transmitting module 420, configured to transmit a registration accept message to the terminal for indicating that a first network is allowed to be accessed in a case that a first condition is met.

The first condition includes any one of the following that:

- the terminal accesses the first network in a first access mode, a second network is in a disaster condition DC or the first network is notified that the second network is in a DC, and an authentication result of the terminal is that the terminal is capable of obtaining a DC service, the first access mode including initial registration, or mobile and periodic update registration; or
- the terminal accesses the first network in a DC dedicated registration mode, a second network is in a DC or the first network is notified that the second network is in a DC, and an authentication result of the terminal is that the terminal is capable of obtaining a DC service.

The first network is a network capable of providing a first service, and the first service includes a DC roaming service.

The second network includes at least one of the following:

a network accessed by the terminal currently;

a home network of the terminal; and a network in a DC.

According to the network access apparatus provided by the embodiments of this application, a terminal is provided with a DC service by accepting a registration request of the terminal in a case that a first condition is met. It may be ensured that the terminal can quickly obtain the DC service in a DC scenario, thus ensuring the normal operation of the service and effectively reducing the interruption time of the service.

In one embodiment, the transmitting module 420 is further configured to:

transmit a registration reject message to the terminal in a case that a second condition is met.

The second condition includes any one of the following that:

the terminal accesses the first network in the first access mode, and the second network is not in a DC or the first network is not notified that the second network is in a DC;

the terminal accesses the first network in the first access mode, the second network is in a DC or the first network is notified that the second network is in a DC, and the authentication result of the terminal is that the terminal is incapable of obtaining the DC service;

the terminal accesses the first network in the DC dedicated registration mode, and the second network is not in a DC or the first network is not notified that the second network is in a DC; or the terminal accesses the first network in the DC dedicated registration mode, the second network is in a DC or the first network is notified that the second network is in a DC, and the authentication result of the terminal is that the terminal is incapable of obtaining the DC service.

In one embodiment, the network access apparatus provided by the embodiments of this application may further include an authentication module (not shown), configured to:

transmit the registration request and/or an authentication request to the second network, and receive an authentication result transmitted by the second network after authenticating the terminal; or request for contract information between the terminal and the second network from the second network, and authenticate the terminal according to the contract information to determine the authentication result.

In one embodiment, the registration reject message includes a first cause value in a case that the terminal accesses the first network in the first access mode and the second network is not in a DC or the first network is not notified that the second network is in a DC.

In one embodiment, in a case that the terminal accesses the first network in the first access mode, the second network is in a DC or the first network is notified that the second network is in a DC, and the authentication result of the terminal is that the terminal is incapable of obtaining the DC service, the registration reject message includes at least one of the following:

a second cause value;

first information, including first indication information for indicating that the terminal is incapable of obtaining the DC service; or including second indication information for indicating a list of networks incapable of providing the terminal with the DC service. The list of networks includes information of the first network.

In one embodiment, the registration reject message includes a third cause value in a case that the terminal accesses the first network in the DC dedicated registration mode and the second network is not in a DC or the first network is not notified that the second network is in a DC.

In one embodiment, in a case that the terminal accesses the first network in the DC dedicated registration mode, the second network is in a DC or the first network is notified that the second network is in a DC, and the authentication result of the terminal is that the terminal is incapable of obtaining the DC service, the registration reject message includes at least one of the following:

a fourth cause value;

first information, including first indication information for indicating that the terminal is incapable of obtaining the DC service; or including second indication information for indicating a list of networks incapable of providing the terminal with the DC service. The list of networks includes information of the first network.

In one embodiment, the registration accept message includes first information.

The first information includes third indication information for indicating that the terminal is capable of obtaining the DC service. Alternatively, the first information includes fourth indication information for indicating a list of networks capable of providing the terminal with the DC service. The list of networks includes information of the first network.

FIG. 5 is a schematic structural diagram 2 of a network access apparatus according to an embodiment of this application. Referring to FIG. 5, the embodiments of this application provide a network access apparatus, which may include:

a transmitting module 510, configured to transmit a registration request to a first network; and a receiving module 520, configured to receive a registration accept message transmitted by the first network for indicating that the first network is allowed to be accessed in a case that a first condition is met.

The first condition includes any one of the following that:

a terminal accesses the first network in a first access mode, a second network is in a disaster condition DC or the first network is notified that the second network is in a DC, and an authentication result of the terminal is that the terminal is capable of obtaining a DC service, the first access mode including initial registration, or mobile and periodic update registration; or a terminal accesses the first network in a DC dedicated registration mode, a second network is in a DC or the first network is notified that the second network is in a DC, and an authentication result of the terminal is that the terminal is capable of obtaining a DC service.

The first network is a network capable of providing a first service, and the first service includes a DC roaming service.

The second network includes at least one of the following:

a network accessed by the terminal currently;

a home network of the terminal; and a network in a DC.

According to the network access apparatus provided by the embodiments of this application, a terminal is provided with a DC service by accepting a registration request of the terminal in a case that a first condition is met. It may be ensured that the terminal can quickly obtain the DC service in a DC scenario, thus ensuring the normal operation of the service and effectively reducing the interruption time of the service.

In one embodiment, the transmitting module 510 is further configured to:

obtain first information, and transmit the registration request to the first network in a case that the first information meets a first predetermined condition.

The first predetermined condition includes any one of the following that:

the first information includes third indication information for indicating that the terminal is capable of obtaining the DC service; or the first information includes fourth indication information for indicating a list of networks capable of providing the terminal with the DC service. The list of networks includes information of the first network.

In one embodiment, the transmitting module 510 is further configured to:

obtain first information, and stop transmitting the registration request to the first network in a case that the first information meets a second predetermined condition.

The second predetermined condition includes any one of the following that:

the first information includes first indication information for indicating that the terminal is incapable of obtaining the DC service; or the first information includes second indication information for indicating a list of networks incapable of providing the terminal with the DC service. The list of networks includes information of the first network.

In one embodiment, the receiving module 520 is further configured to:

receive a registration reject message transmitted by the first network in a case that a second condition is met.

The second condition includes any one of the following that:

the terminal accesses the first network in the first access mode, and the second network is not in a DC or the first network is not notified that the second network is in a DC;

the terminal accesses the first network in the first access mode, the second network is in a DC or the first network is notified that the second network is in a DC, and the authentication result of the terminal is that the terminal is incapable of obtaining the DC service;

the terminal accesses the first network in the DC dedicated registration mode, and the second network is not in a DC or the first network is not notified that the second network is in a DC; or the terminal accesses the first network in the DC dedicated registration mode, the second network is in a DC or the first network is notified that the second network is in a DC, and the authentication result of the terminal is that the terminal is incapable of obtaining the DC service.

In one embodiment, the registration reject message includes a first cause value in a case that the terminal accesses the first network in the first access mode and the second network is not in a DC or the first network is not notified that the second network is in a DC.

In one embodiment, in a case that the terminal accesses the first network in the first access mode, the second network is in a DC or the first network is notified that the second network is in a DC, and the authentication result of the terminal is that the terminal is incapable of obtaining the DC service, the registration reject message includes at least one of the following:

a second cause value;

first information, including first indication information for indicating that the terminal is incapable of obtaining the DC service; or including second indication information for indicating a list of networks incapable of providing the terminal with the DC service. The list of networks includes information of the first network.

In one embodiment, the registration reject message includes a third cause value in a case that the terminal accesses the first network in the DC dedicated registration mode and the second network is not in a DC or the first network is not notified that the second network is in a DC.

In one embodiment, in a case that the terminal accesses the first network in the DC dedicated registration mode, the second network is in a DC or the first network is notified that the second network is in a DC, and the authentication result of the terminal is that the terminal is incapable of obtaining the DC service, the registration reject message includes at least one of the following:

a fourth cause value;

first information, including first indication information for indicating that the terminal is incapable of obtaining the DC service; or including second indication information for indicating a list of networks incapable of providing the terminal with the DC service. The list of networks includes information of the first network.

In one embodiment, the registration accept message includes first information.

The first information includes third indication information for indicating that the terminal is capable of obtaining the DC service. Alternatively, the first information includes fourth indication information for indicating a list of networks capable of providing the terminal with the DC service. The list of networks includes information of the first network.

The network access apparatus in the embodiments of this application may be an apparatus, an apparatus or electronic device with an operating system, and a component, an integrated circuit, or a chip in a terminal. The apparatus or electronic device may be a mobile terminal or may be a non-mobile terminal. For example, the mobile terminal may include, but is not limited to, the type of the terminal 11 listed above, and the non-mobile terminal may be a server, a network attached storage (NAS), a personal computer (PC), a television (TV), an automatic teller machine, or a self-service machine, and the like. The embodiments of this application are not specifically limited.

The network access apparatus provided by the embodiments of this application may implement the processes implemented by the method embodiments of FIG. 2 and FIG. 3 and achieve the same technical effect. To avoid repetition, details are not described herein again.

Optionally, as shown in FIG. 6, the embodiments of this application further provide a communication device 600, including a processor 601, a memory 602, and programs or instructions stored in the memory 602 and executable on the processor 601. For example, the communication device 600 is a terminal, and the programs or instructions, when executed by the processor 601, implement the various processes of the terminal-side embodiments of the foregoing network access method and achieve the same technical effect. The communication device 600 is a network-side device, and the programs or instructions, when executed by the processor 601, implement the various processes of the network-side embodiments of the foregoing network access method and achieve the same technical effect. To avoid repetition, details are not described herein again.

Figure 7:
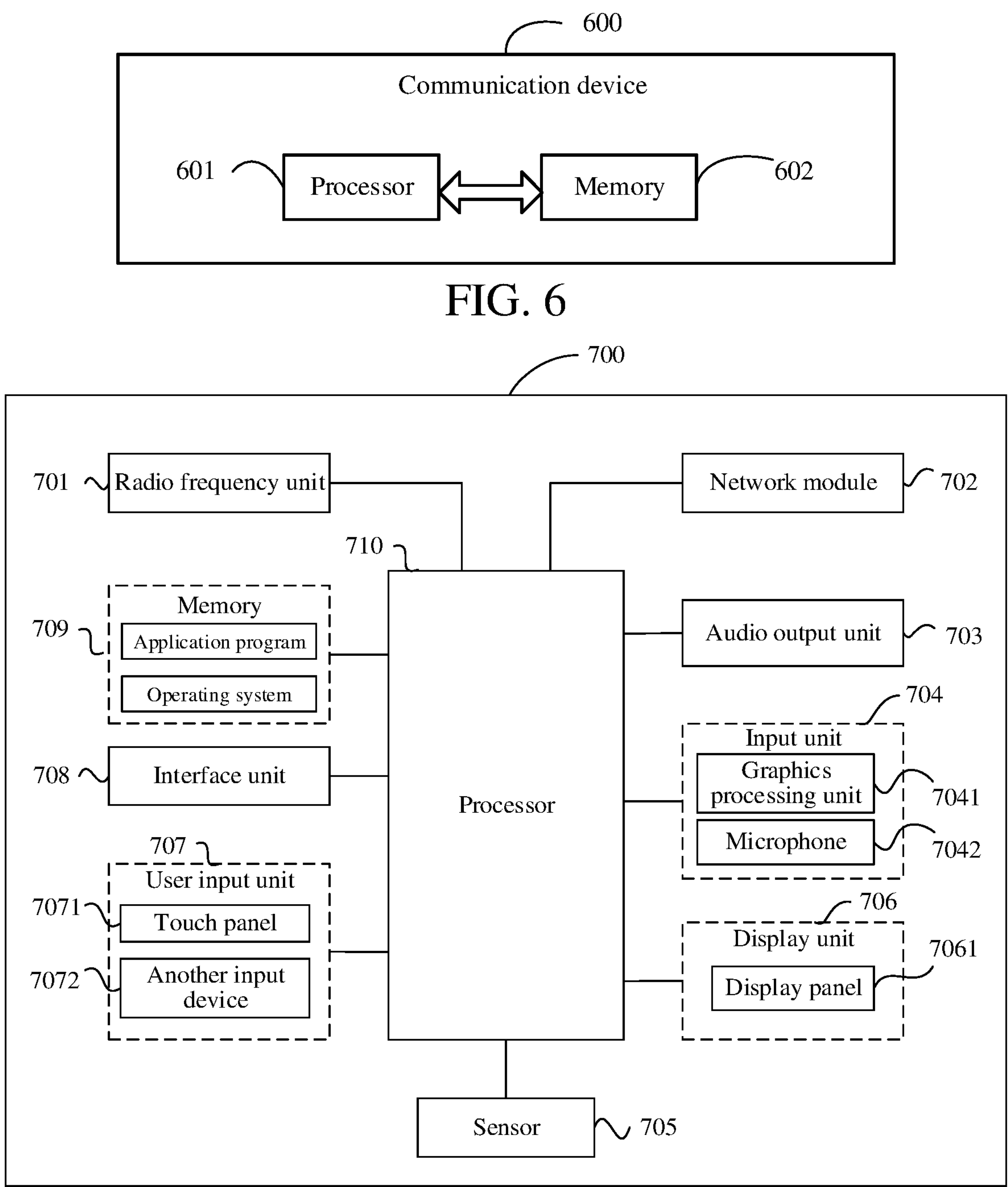
FIG. 7 is a schematic diagram of a hardware structure of a terminal according to an embodiment of this application.

The embodiments of this application further provide a terminal, including a processor and a communication interface. The communication interface is configured to: transmit a registration request to a first network; and receive a registration accept message transmitted by the first network for indicating that the first network is allowed to be accessed in a case that a first condition is met. The terminal embodiment corresponds to the foregoing terminal-side method embodiments. Each implementation process and implementation mode of the foregoing method embodiments may be applied to the terminal embodiment, and can achieve the same technical effect. Optionally, FIG. 7 is a schematic diagram of a hardware structure of a terminal according to an embodiment of this application.

The terminal 700 includes, but is not limited to: at least some components such as a radio frequency unit 701, a network module 702, an audio output unit 703, an input unit 704, a sensor 705, a display unit 706, a user input unit 707, an interface unit 708, a memory 709, and a processor 710.

A person skilled in the art may understand that the terminal 700 may further include a power supply (such as a battery) for supplying power to the components. The power supply may be logically connected to the processor 710 by a power management system, thereby implementing functions such as charging, discharging, and power consumption management by using the power management system. The terminal structure shown in FIG. 7 does not constitute a limitation on the terminal, and the terminal may include more or fewer components than shown, or combine some components, or have different component arrangements, which are not described herein in detail.

It is to be understood that in the embodiments of this application, the input unit 704 may include a graphics processing unit (GPU) 7041 and a microphone 7042. The graphics processing unit 7041 performs processing on image data of a static picture or a video that is obtained by an image acquisition apparatus (for example, a camera) in a video acquisition mode or an image acquisition mode. The display unit 706 may include a display panel 7061. The display panel 7061 may be configured in the form of a liquid crystal display, an organic light-emitting diode, or the like. The user input unit 707 includes a touch panel 7071 and another input device 7072. The touch panel 7071 is also referred to as a touch screen. The touch panel 7071 may include two parts: a touch detection apparatus and a touch controller. The another input device 7072 may include, but not limited to, a physical keyboard, a functional key (such as a volume control key or a switch key), a track ball, a mouse, and a joystick, which are not described herein in detail.

In the embodiments of this application, the radio frequency unit 701 receives downlink data from a network-side device and then transmits the downlink data to the processor 710 for processing. In addition, uplink data is transmitted to the network-side device. Generally, the radio frequency unit 701 includes, but is not limited to, an antenna, at least one amplifier, a transceiver, a coupler, a low noise amplifier, a duplexer, and the like.

The memory 709 may be configured to store software programs or instructions and various data. The memory 709 may mainly include a program or instruction storage area and a data storage area. The program or instruction storage area may store an operating system, applications or instructions required by at least one function (for example, a sound playback function and an image display function), and the like. In addition, the memory 709 may include a high-speed random access memory and may further include a non-transient memory. The non-transient memory may be a read-only memory (ROM), a programmable read-only memory (PROM), an erasable programmable read-only memory (EPROM), an electrically erasable programmable read-only memory (EEPROM), or a flash memory. For example, the memory is at least one magnetic disk storage device, a flash memory device, or another non-transient solid-state storage device.

The processor 710 may include one or more processing units. Optionally, the processor 710 may integrate an application processor and a modem processor, where the application processor mainly processes an operating system, a user interface, application programs or instructions, and the like, and the modem processor mainly processes wireless communication such as a baseband processor. It may be understood that the modem processor may not be integrated into the processor 710.

The radio frequency unit 701 is configured to:

transmit a registration request to a first network; and receive a registration accept message transmitted by the first network for indicating that the first network is allowed to be accessed in a case that a first condition is met.

The first condition includes any one of the following that:

the terminal accesses the first network in a first access mode, a second network is in a disaster condition DC or the first network is notified that the second network is in a DC, and an authentication result of the terminal is that the terminal is capable of obtaining a DC service, the first access mode including initial registration, or mobile and periodic update registration; or the terminal accesses the first network in a DC dedicated registration mode, a second network is in a DC or the first network is notified that the second network is in a DC, and an authentication result of the terminal is that the terminal is capable of obtaining a DC service.

The first network is a network capable of providing a first service, and the first service includes a DC roaming service.

The second network includes at least one of the following:

a network accessed by the terminal currently;

a home network of the terminal; and a network in a DC.

According to the terminal provided by the embodiments of this application, a terminal is provided with a DC service by accepting a registration request of the terminal in a case that a first condition is met. It may be ensured that the terminal can quickly obtain the DC service in a DC scenario, thus ensuring the normal operation of the service and effectively reducing the interruption time of the service.

Optionally, the radio frequency unit 701 is further configured to obtain first information, and transmit the registration request to the first network in a case that the first information meets a first predetermined condition.

The first predetermined condition includes any one of the following that:

the first information includes third indication information for indicating that the terminal is capable of obtaining the DC service; or the first information includes fourth indication information for indicating a list of networks capable of providing the terminal with the DC service. The list of networks includes information of the first network.

Optionally, the radio frequency unit 701 is further configured to obtain first information, and transmit the registration request to the first network in a case that the first information meets a first predetermined condition.

The first predetermined condition includes any one of the following that:

the first information includes third indication information for indicating that the terminal is capable of obtaining the DC service; or the first information includes fourth indication information for indicating a list of networks capable of providing the terminal with the DC service. The list of networks includes information of the first network.

Optionally, the radio frequency unit 701 is further configured to obtain first information, and stop transmitting the registration request to the first network in a case that the first information meets a second predetermined condition.

The second predetermined condition includes any one of the following that:

the first information includes first indication information for indicating that the terminal is incapable of obtaining the DC service; or the first information includes second indication information for indicating a list of networks incapable of providing the terminal with the DC service. The list of networks includes information of the first network.

Optionally, the radio frequency unit 701 is further configured to receive a registration reject message transmitted by the first network in a case that a second condition is met.

The second condition includes any one of the following that:

the terminal accesses the first network in the first access mode, and the second network is not in a DC or the first network is not notified that the second network is in a DC;

the terminal accesses the first network in the first access mode, the second network is in a DC or the first network is notified that the second network is in a DC, and the authentication result of the terminal is that the terminal is incapable of obtaining the DC service;

the terminal accesses the first network in the DC dedicated registration mode, and the second network is not in a DC or the first network is not notified that the second network is in a DC; or the terminal accesses the first network in the DC dedicated registration mode, the second network is in a DC or the first network is notified that the second network is in a DC, and the authentication result of the terminal is that the terminal is incapable of obtaining the DC service.

The embodiments of this application further provide a network-side device, including a processor and a communication interface. The communication interface is configured to: receive a registration request transmitted by a terminal; and transmit a registration accept message to the terminal for indicating that a first network is allowed to be accessed in a case that a first condition is met. The network-side device embodiment corresponds to the foregoing network-side device method embodiments. Each implementation process and implementation mode of the foregoing method embodiments may be applied to the network-side device embodiment, and can achieve the same technical effect.

Figure 8:
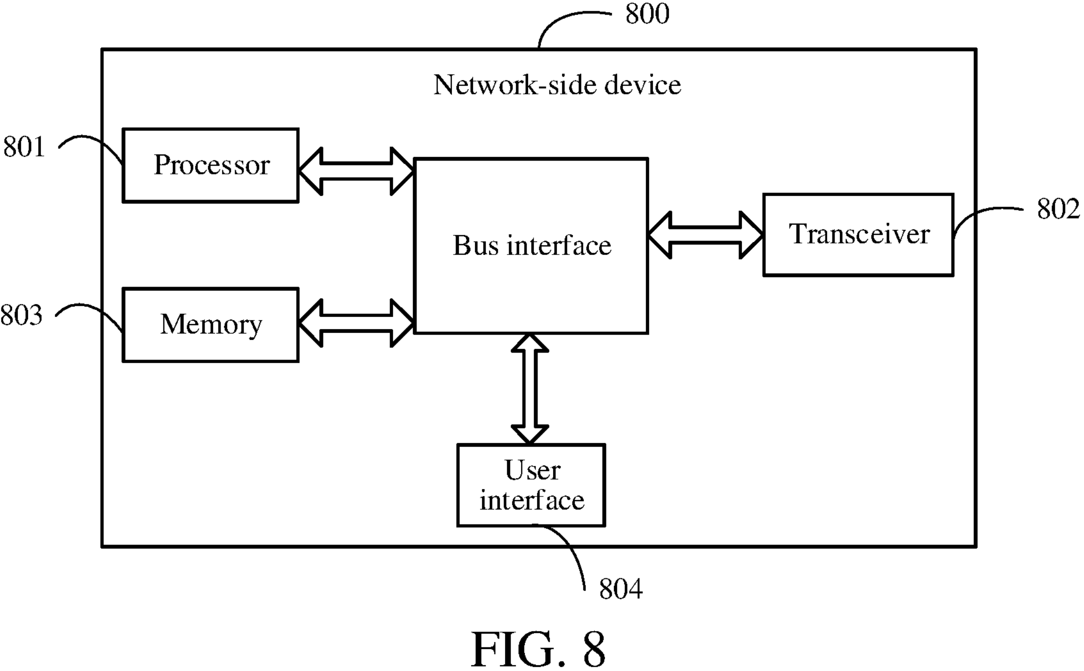
FIG. 8 is a schematic diagram of a hardware structure of a network-side device according to an embodiment of this application.

Optionally, the embodiments of this application further provide a network-side device. As shown in FIG. 8, a network device 800 includes: a processor 801, a transceiver 802, a memory 803, a user interface 804, and a bus interface.

In the embodiments of this application, the network-side device 800 further includes: computer programs stored in the memory 803 and executable on the processor 801. The computer programs are executed by the processor 801 to implement the method performed by each module shown in FIG. 4 and to achieve the same technical effect. To avoid repetition, details are not described herein again.

In FIG. 8, a bus architecture may include any quantity of interconnected buses and bridges, and connects together circuits that are of one or more processors represented by the processor 801 and of a memory represented by the memory 803. The bus architecture may further connect various other circuits of a peripheral, a voltage regulator, a power management circuit, and the like. This is well known in the art, and therefore, no description is provided in this specification. The bus interface provides an interface. The transceiver 802 may be a plurality of components, including a transmitter and a receiver, and providing units for communicating with various other apparatuses on a transmission medium. For different user equipment, the user interface 804 may be an interface capable of externally or internally connecting a required device. The connected device includes, but not limited to, a keypad, a display, a speaker, a microphone, and a joystick.

The processor 801 is responsible for the management of the bus architecture and normal processing, and the memory 803 may store data used when the processor 801 executes an operation.

The embodiments of this application further provide a non-transitory readable storage medium. The non-transitory readable storage medium stores programs or instructions. The programs or instructions, when executed by a processor, implement the various processes executed by the modules shown in FIG. 4 and achieve the same technical effect, which is not described herein again to avoid repetition.

The processor is a processor in the terminal in the foregoing embodiments. The non-transitory readable storage medium includes a non-transitory computer-readable storage medium such as a read-only memory (ROM), a random access memory (RAM), a magnetic disk, or an optical disc.

The embodiments of this application also provide a chip. The chip includes a processor and a communication interface. The communication interface is coupled to the processor. The processor is configured to execute programs or instructions to implement the various processes of the foregoing network access method embodiments and achieve the same technical effect, which is not described herein again to avoid repetition.

It is to be understood that the chip referred to in the embodiments of this application may also be referred to as a system-on-chip, and the like.

It is to be noted that the terms "include", "comprise", or any other variation thereof in this specification is intended to cover a non-exclusive inclusion, whereby a process, method, object, or apparatus including a series of elements not only includes those elements, but also includes other elements that are not explicitly listed, or also includes elements inherent to such process, method, object, or apparatus. Without more limitations, elements defined by the sentence "including a" does not exclude that there are still other same elements in the process, method, object, or apparatus. Furthermore, it is to be noted that the scope of the methods and apparatuses in the implementations of this application is not limited to performing functions in the order shown or discussed, but may also include performing functions in a substantially simultaneous manner or in reverse order depending on the functions involved. For example, the described methods may be performed in a different order than described, and various steps may be added, omitted, or combined. In addition, features described in some examples may also be combined in other examples.

According to the descriptions in the above implementations, a person skilled in the art may clearly learn that the method according to the foregoing embodiments may be implemented by relying on software and a general hardware platform or by using hardware. But in many cases, the former is a preferred implementation. Based on such an understanding, the technical solutions of this application essentially, or the part contributing to the prior art, may be presented in the form of a computer software product. The computer software product is stored in a non-transitory storage medium (for example, a ROM/RAM, a magnetic disk, or an optical disc) including several instructions to enable a terminal (which may be a mobile phone, a computer, a server, an air conditioner, a network device, or the like) to perform the methods described in the various embodiments of this application.

The embodiments of this application have been described above with reference to the accompanying drawings. This application is not limited to the foregoing implementations, and the foregoing implementations are merely exemplary and not limitative. A person of ordinary skill in the art may make various forms under the teaching of this application without departing from the spirit of this application and the protection scope of the claims, and such forms shall all fall within the protection scope of this application.

What is claimed is:

1. A network access method, comprising:

obtaining, by a terminal, first information, and transmitting a registration request to a first network in a case that the first information meets a first predetermined condition, wherein the first predetermined condition comprises: the first information comprises third indication information for indicating that the terminal is capable of obtaining the DC service;

and receiving, by the terminal, a registration accept message transmitted by the first network for indicating that the first network is allowed to be accessed in a case that a first condition is met, the first condition comprising any one of following that:

the terminal accesses the first network in a first access mode, a second network is in a disaster condition (DC) or the first network is notified that the second network is in a DC, and an authentication result of the terminal is that the terminal is capable of obtaining a DC service, the first access mode comprising initial registration, or mobile and periodic update registration; or the terminal accesses the first network in a DC dedicated registration mode, a second network is in a DC or the first network is notified that the second network is in a DC, and an authentication result of the terminal is that the terminal is capable of obtaining a DC service, wherein the first network is a network capable of providing a first service, and the first service comprises a DC roaming service; and the second network comprises at least one of following:

a network accessed by the terminal currently;

a home network of the terminal; or a network in a DC; and the method further comprises:

obtaining, by the terminal, the first information, and stopping transmitting the registration request to the first network in a case that the first information meets a second predetermined condition, wherein the second predetermined condition comprises any one of following that:

the first information comprises first indication information for indicating that the terminal is incapable of obtaining the DC service; or the first information comprises second indication information for indicating a list of networks incapable of providing the terminal with the DC service, the list of networks comprising information of the first network.

2. The network access method according to claim 1, wherein the first predetermined condition further comprises that the first information comprises fourth indication information for indicating a list of networks capable of providing the terminal with the DC service, the list of networks comprising information of the first network.

3. The network access method according to claim 1, further comprising:

receiving, by the terminal, a registration reject message transmitted by the first network in a case that a second condition is met, the second condition comprising any one of following that:

the terminal accesses the first network in the first access mode, and the second network is not in a DC or the first network is not notified that the second network is in a DC;

the terminal accesses the first network in the first access mode, the second network is in a DC or the first network is notified that the second network is in a DC, and the authentication result of the terminal is that the terminal is incapable of obtaining the DC service;

the terminal accesses the first network in the DC dedicated registration mode, and the second network is not in a DC or the first network is not notified that the second network is in a DC; or the terminal accesses the first network in the DC dedicated registration mode, the second network is in a DC or the first network is notified that the second network is in a DC, and the authentication result of the terminal is that the terminal is incapable of obtaining the DC service.

4. The network access method according to claim 3, wherein the registration reject message comprises a first cause value in a case that the terminal accesses the first network in the first access mode and the second network is not in a DC or the first network is not notified that the second network is in a DC; or in a case that the terminal accesses the first network in the first access mode, the second network is in a DC or the first network is notified that the second network is in a DC, and the authentication result of the terminal is that the terminal is incapable of obtaining the DC service, the registration reject message comprises at least one of following:

a second cause value;

first information, comprising first indication information for indicating that the terminal is incapable of obtaining the DC service; or comprising second indication information for indicating a list of networks incapable of providing the terminal with the DC service, the list of networks comprising information of the first network; or the registration reject message comprises a third cause value in a case that the terminal accesses the first network in the DC dedicated registration mode and the second network is not in a DC or the first network is not notified that the second network is in a DC; or in a case that the terminal accesses the first network in the DC dedicated registration mode, the second network is in a DC or the first network is notified that the second network is in a DC, and the authentication result of the terminal is that the terminal is incapable of obtaining the DC service, the registration reject message comprises at least one of following:

a fourth cause value;

first information, comprising first indication information for indicating that the terminal is incapable of obtaining the DC service; or comprising second indication information for indicating a list of networks incapable of providing the terminal with the DC service, the list of networks comprising information of the first network.

5. The network access method according to claim 1, wherein the registration accept message comprises first information;

the first information comprises third indication information for indicating that the terminal is capable of obtaining the DC service; or the first information comprises fourth indication information for indicating a list of networks capable of providing the terminal with the DC service, the list of networks comprising information of the first network.

6. A terminal, comprising a processor, a memory, and programs or instructions stored in the memory and executable on the processor, the programs or instructions, when executed by the processor, causes the terminal to perform:

obtaining, by the terminal, first information, and transmitting a registration request to a first network in a case that the first information meets a first predetermined condition, wherein the first predetermined condition comprises: the first information comprises third indication information for indicating that the terminal is capable of obtaining the DC service;

and receiving, by the terminal, a registration accept message transmitted by the first network for indicating that the first network is allowed to be accessed in a case that a first condition is met, the first condition comprising any one of following that:

the terminal accesses the first network in a first access mode, a second network is in a disaster condition (DC) or the first network is notified that the second network is in a DC, and an authentication result of the terminal is that the terminal is capable of obtaining a DC service, the first access mode comprising initial registration, or mobile and periodic update registration; or the terminal accesses the first network in a DC dedicated registration mode, a second network is in a DC or the first network is notified that the second network is in a DC, and an authentication result of the terminal is that the terminal is capable of obtaining a DC service, wherein the first network is a network capable of providing a first service, and the first service comprises a DC roaming service; and the second network comprises at least one of following:

a network accessed by the terminal currently;

a home network of the terminal; or a network in a DC; and further comprises the steps of:

obtaining, by the terminal, the first information, and stopping transmitting the registration request to the first network in a case that the first information meets a second predetermined condition, wherein the second predetermined condition comprises any one of following that:

the first information comprises first indication information for indicating that the terminal is incapable of obtaining the DC service; or the first information comprises second indication information for indicating a list of networks incapable of providing the terminal with the DC service, the list of networks comprising information of the first network.

7. The terminal according to claim 6, wherein the first predetermined condition further comprises that the first information comprises fourth indication information for indicating a list of networks capable of providing the terminal with the DC service, the list of networks comprising information of the first network.

8. The terminal according to claim 6, wherein the programs or instructions, when executed by the processor, causes the terminal to perform:

receiving, by the terminal, a registration reject message transmitted by the first network in a case that a second condition is met, the second condition comprising any one of following that:

the terminal accesses the first network in the first access mode, and the second network is not in a DC or the first network is not notified that the second network is in a DC;

the terminal accesses the first network in the first access mode, the second network is in a DC or the first network is notified that the second network is in a DC, and the authentication result of the terminal is that the terminal is incapable of obtaining the DC service;

the terminal accesses the first network in the DC dedicated registration mode, and the second network is not in a DC or the first network is not notified that the second network is in a DC; or the terminal accesses the first network in the DC dedicated registration mode, the second network is in a DC or the first network is notified that the second network is in a DC, and the authentication result of the terminal is that the terminal is incapable of obtaining the DC service.

9. The terminal according to claim 8, wherein the registration reject message comprises a first cause value in a case that the terminal accesses the first network in the first access mode and the second network is not in a DC or the first network is not notified that the second network is in a DC; or in a case that the terminal accesses the first network in the first access mode, the second network is in a DC or the first network is notified that the second network is in a DC, and the authentication result of the terminal is that the terminal is incapable of obtaining the DC service, the registration reject message comprises at least one of following:

a second cause value;

first information, comprising first indication information for indicating that the terminal is incapable of obtaining the DC service; or comprising second indication information for indicating a list of networks incapable of providing the terminal with the DC service, the list of networks comprising information of the first network; or the registration reject message comprises a third cause value in a case that the terminal accesses the first network in the DC dedicated registration mode and the second network is not in a DC or the first network is not notified that the second network is in a DC; or in a case that the terminal accesses the first network in the DC dedicated registration mode, the second network is in a DC or the first network is notified that the second network is in a DC, and the authentication result of the terminal is that the terminal is incapable of obtaining the DC service, the registration reject message comprises at least one of following:

a fourth cause value;

first information, comprising first indication information for indicating that the terminal is incapable of obtaining the DC service; or comprising second indication information for indicating a list of networks incapable of providing the terminal with the DC service, the list of networks comprising information of the first network.

10. The terminal according to claim 6, wherein the registration accept message comprises first information;

the first information comprises third indication information for indicating that the terminal is capable of obtaining the DC service; or the first information comprises fourth indication information for indicating a list of networks capable of providing the terminal with the DC service, the list of networks comprising information of the first network.

11. A non-transitory computer-readable storage medium, storing programs or instructions, wherein the programs or instructions, when executed by a processor of a terminal, causes the terminal to perform:

obtaining, by the terminal, first information, and transmitting a registration request to a first network in a case that the first information meets a first predetermined condition, wherein the first predetermined condition comprises: the first information comprises third indication information for indicating that the terminal is capable of obtaining the DC service;

and receiving, by the terminal, a registration accept message transmitted by the first network for indicating that the first network is allowed to be accessed in a case that a first condition is met, the first condition comprising any one of following that:

the terminal accesses the first network in a first access mode, a second network is in a disaster condition (DC) or the first network is notified that the second network is in a DC, and an authentication result of the terminal is that the terminal is capable of obtaining a DC service, the first access mode comprising initial registration, or mobile and periodic update registration; or the terminal accesses the first network in a DC dedicated registration mode, a second network is in a DC or the first network is notified that the second network is in a DC, and an authentication result of the terminal is that the terminal is capable of obtaining a DC service, wherein the first network is a network capable of providing a first service, and the first service comprises a DC roaming service; and the second network comprises at least one of following:

a network accessed by the terminal currently;

a home network of the terminal; or a network in a DC; and further comprises the steps of:

obtaining, by the terminal, the first information, and stopping transmitting the registration request to the first network in a case that the first information meets a second predetermined condition, wherein the second predetermined condition comprises any one of following that:

the first information comprises first indication information for indicating that the terminal is incapable of obtaining the DC service; or the first information comprises second indication information for indicating a list of networks incapable of providing the terminal with the DC service, the list of networks comprising information of the first network.

12. The non-transitory computer-readable storage medium according to claim 11, wherein the first predetermined condition further comprises that the first information comprises fourth indication information for indicating a list of networks capable of providing the terminal with the DC service, the list of networks comprising information of the first network.

13. The non-transitory computer-readable storage medium according to claim 11, wherein the programs or instructions, when executed by the processor, causes the terminal to perform:

receiving, by the terminal, a registration reject message transmitted by the first network in a case that a second condition is met, the second condition comprising any one of following that:

the terminal accesses the first network in the first access mode, and the second network is not in a DC or the first network is not notified that the second network is in a DC;

the terminal accesses the first network in the first access mode, the second network is in a DC or the first network is notified that the second network is in a DC, and the authentication result of the terminal is that the terminal is incapable of obtaining the DC service;

the terminal accesses the first network in the DC dedicated registration mode, and the second network is not in a DC or the first network is not notified that the second network is in a DC; or the terminal accesses the first network in the DC dedicated registration mode, the second network is in a DC or the first network is notified that the second network is in a DC, and the authentication result of the terminal is that the terminal is incapable of obtaining the DC service.

14. The non-transitory computer-readable storage medium according to claim 13, wherein the registration reject message comprises a first cause value in a case that the terminal accesses the first network in the first access mode and the second network is not in a DC or the first network is not notified that the second network is in a DC; or in a case that the terminal accesses the first network in the first access mode, the second network is in a DC or the first network is notified that the second network is in a DC, and the authentication result of the terminal is that the terminal is incapable of obtaining the DC service, the registration reject message comprises at least one of following:

a second cause value;

first information, comprising first indication information for indicating that the terminal is incapable of obtaining the DC service; or comprising second indication information for indicating a list of networks incapable of providing the terminal with the DC service, the list of networks comprising information of the first network; or the registration reject message comprises a third cause value in a case that the terminal accesses the first network in the DC dedicated registration mode and the second network is not in a DC or the first network is not notified that the second network is in a DC; or in a case that the terminal accesses the first network in the DC dedicated registration mode, the second network is in a DC or the first network is notified that the second network is in a DC, and the authentication result of the terminal is that the terminal is incapable of obtaining the DC service, the registration reject message comprises at least one of following:

a fourth cause value;

first information, comprising first indication information for indicating that the terminal is incapable of obtaining the DC service; or comprising second indication information for indicating a list of networks incapable of providing the terminal with the DC service, the list of networks comprising information of the first network.

15. The non-transitory computer-readable storage medium according to claim 11, wherein the registration accept message comprises first information;

the first information comprises third indication information for indicating that the terminal is capable of obtaining the DC service; or the first information comprises fourth indication information for indicating a list of networks capable of providing the terminal with the DC service, the list of networks comprising information of the first network.

* * * * *